United States Patent Office 3,432,237
Patented Mar. 11, 1969

3,432,237
VELOCITY MEASURING DEVICE
Robert A. Flower, White Plains, Gus Stavis, Briarcliff Manor, and George R. Gamertsfelder, Pleasantville, N.Y., assignors to Singer-General Precision, Inc., a corporation of Delaware
Filed Mar. 31, 1964, Ser. No. 356,146
U.S. Cl. 356—28          3 Claims
Int. Cl. G01p 3/36

ABSTRACT OF THE DISCLOSURE

A source of radiation such as a laser directs a substantially monochromatic beam toward a reference surface. The reflected radiation is passed through an optical aperture or a plurality of slits located near the source and received by a photomultiplier tube which has its anode connected to a frequency meter, the output of which is a function of the relative velocity between the radiation source and a reflecting surface. It is also contemplated that other wave sources of limited bandwidth yielding radio waves, sound or light may be used. A pair of such systems having their velocity axes inclined at equal angles on opposite sides of a vehicle may be used with a suitable computer to obtain velocity and drift angle of the vehicle.

Description of the invention

This invention relates to velocity measuring devices in which a frequency characteristic proportional to the relative velocity between a body and a target is derived from wave radiation projected from the body to the target, reflected therefrom and returned to the projecting body. More particularly it has been discovered that when wave radiation, either in the sound, ultrasonic sound or in any of the electromagnetic radiation ranges including light, or radio frequencies is projected onto a target which acts as a scattering area, the return pattern is made up of discrete lobes. It is this unique pattern of reflected signal which is used by the present invention for deriving the relative velocity information.

It is frequently desirable to measure the relative velocity between two objects without having any physical contact between them. Various devices using both light and radio waves have been devised to accomplish this purpose. However, these prior art devices are in the main either costly or impractical.

Noncontact velocimeters are particularly suitable for vehicle of the hovercraft type or aircraft where ground contact is impossible. Likewise, in many instances wheeled or tracked vehicles which contact the ground many require a non-contacting velocimeter particularly when they are operated over terrains which are not suitable for fifth-wheel speedometers. Additionally and aside from its utility in measuring the speed of vehicles, the invention also is particularly useful for measuring the velocity of materials passing a fixed point. As for example in measuring the velocity of strip or web materials as in steel and aluminum mills and the like.

An object of the invention is to provide a velocimeter for determining the relative velocity between two objects which are not in physical contact or where such physical contact as may be present does not lead to accurate velocity determination.

Another object of the invention is to provide a frictionless velocimeter not subject to wear and which has an inherent long life.

A further object of the invention is to provide a velocimeter which is accurate, reliable and trouble-free in operation.

The invention contemplates a velocimeter for measuring the velocity between two objects or bodies which may be, for example, a vehicle and the terrain over which it passes or a strip, web or rod of material passing a fixed structural support. In either event, a wave generator is mounted on one of the objects, say the vehicle in the one case or the fixed support in the other. The waves so generated are projected onto a finite area on the other body, i.e., the terrain or passing material. These waves are reflected in a random lobed pattern and a receiver fixed in relation to the body bearing the generating equipment detects the power contained in successive lobes as they pass a receiving aperture or apertures in the receiver deriving therefrom a signal whose frequency is determinative of the relative velocity between the two bodies or objects. The finite area on which the generated waves are projected and from which they are backscattered will hereinafter be termed the illuminated area regardless of the wavelength or nature of these waves, i.e., whether they are classified generally as sound, light or radio waves.

When the beam projected from the one body has a spherical wave front, that is, diverges as it is projected toward the target, the relative distances to individual scatterers located in the illuminated area vary to a slight extent as the illuminating beam's finite area passes over the scatterers. This has the effect of producing a varying relative phase of the reflected signals which in turn, to an observer located at the receiver, has the effect of making the lobed reflected pattern appear to rotate about the center of the illuminated area counter to the relative translation between the two bodies and by an equal distance. Thus in this instance the velocity with which the lobes pass the observer located at the receiver and moving with it is twice the velocity of the observer relative to the reflecting body.

On the other hand, if the illuminating beam has a plane wave front achieved either by locating the transmitting source at infinity or more practically achieved by focusing the beam, then the relative distances of all portions of the finite illuminated area distance from the effective position of the projecting source remain the same, and there is no relative phase change as the illuminated area passes over selected scatterers and the phenomenon of apparent lobe rotation does not occur and the lobes pass the observer located at the receiving aperture at the velocity of the observer with respect to the reflecting body. It will be apparent that whether spherical or plane wave front beam projection is used the results achieved are the same with only the scale factor being affected. Accordingly, the remaining discussion will concern itself only with spherical wave front projection since one skilled in the art can easily adapt the apparatus to plane wave front projection by merely recalibrating the output indicator.

The exact nature of the invention will be more clearly understood from the following description considered in conjunction with the drawings in which.

Figure 1:
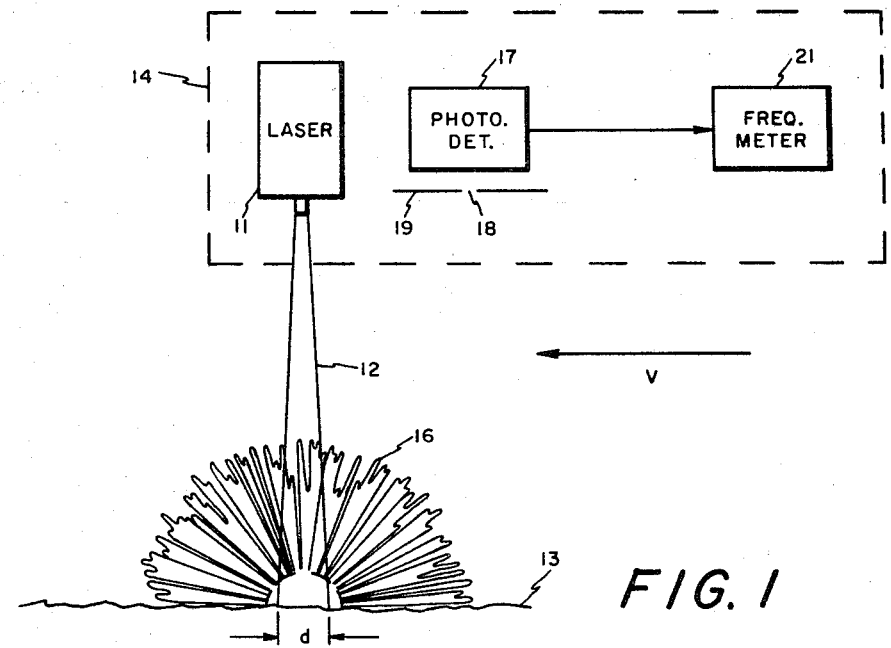
FIGURE 1 is a schematic representation of one embodiment of the invention.

Referring now to FIGURE 1, a laser 11 or other monochromatic source of electromagnetic radiation projects a beam of radiation 12 toward a reflecting surface 13. The laser 11 is mounted on a supporting structure generally indicated by the dotted rectangle 14 which may be a vehicle in which case the reflecting surface 13 constitutes the terrain over which the vehicle is traveling. On the other hand the reflecting surface 13 may constitute a travelling band or sheet of material in which event the supporting structure would constitute a fixed support. In any event the beam 12 in impinging on the surface 13 over a finite area having a diameter $d$ produces a backscattered pattern 16. The backscattered pattern will be broad in extent if the reflecting surface 13 is non-specular and will be composed of lobes of random amplitude, width and spacing. For a diffuse reflecting surface the details of the pattern will principally depend on the effective size of the radiating aperture of the laser 11, with the reflected lobes of the pattern having a mean width equal to the radiating aperture when the reflected lobes are measured in the immediate vicinity of the transmitting aperture of the laser.

An optimum backscattered pattern is generated when the illuminating source is monochromatic or nearly so. However, the bandwidth of the illuminating source may be widened with a resultant degradation of the distinctness of the lobes. That is, the average peak-to-null ratio in the backscattered pattern tends to decrease as the bandwidth of the illuminating source increases, although even with relatively large bandwidth sources a useful pattern may be produced.

Figure 4:
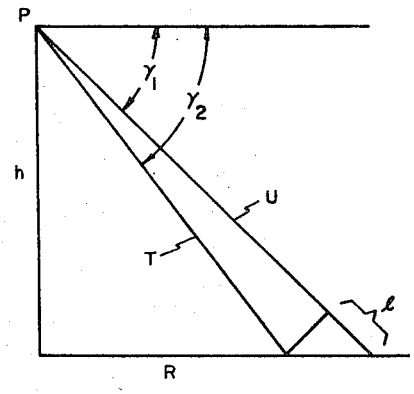
FIGURE 4 is a diagram which will be found useful in understanding the explanation for arriving at a desirable bandwidth parameter.
Figure 5:
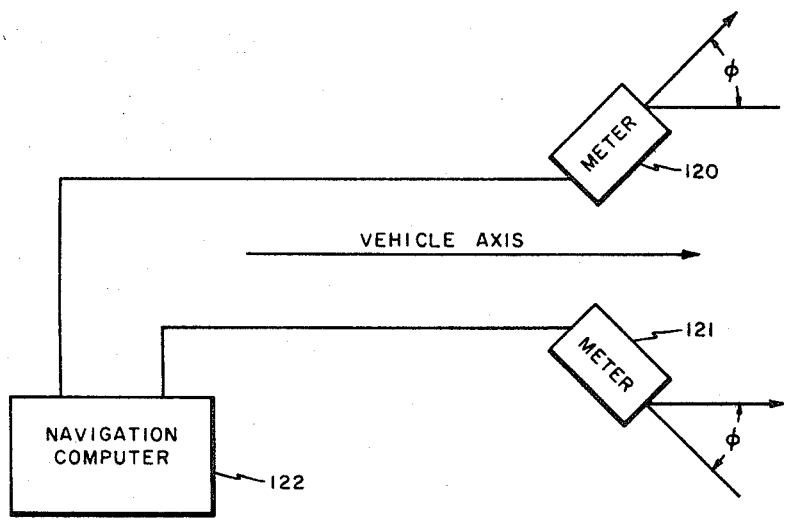
FIGURE 5 is a schematic representation of a system for detecting velocity and drift employing any one of the embodiments shown in FIGURES 1, 2 and 3; and, FIGURE 6 is a vector diagram useful in understanding the operation of the system illustrated in FIGURE 5.
Figure 6:
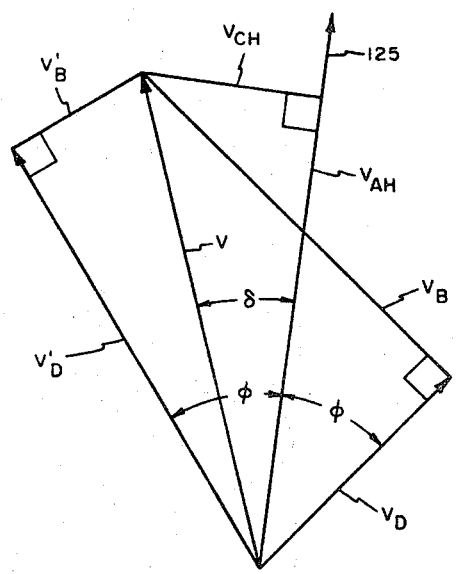

In general the desirable bandwidth may be determined by the following mathematical analysis. Referring to FIGURE 4, consider that the radiating source is located at the point P at altitude $h$ radiating wave energy toward the surface R in a beam encompassed within the limits T–U. It will be apparent that the edge of the beam limit U has a length which exceeds that of the beam limit T by the length $l$. Consider now that the upper limit of the bandwidth of the signal transmitted has a frequency $f_1$ while the lower limit of the bandwidth has a frequency $f_2$. In order to produce practical results the number of wavelengths $n_1$ at the frequency $f_1$ contained in the differential distance $l$ should not exceed the number of wavelengths $n_2$ at the frequency $f_2$ contained in the same distance $l$ by more than one.

Mathematically the number of wavelengths $n_1$ and $n_2$ may be expressed in terms of length $l$ and frequencies $f_1$ and $f_2$ as $$n_1 = lf_1/c \quad (1)$$

and $$n_2 = lf_2/c \quad (2)$$

where $c$ is the speed of the wave energy in the transmitting medium.

To establish the requirement set forth above, $n_1$ minus $n_2$ must be less than one or mathematically in terms of frequency and differential path length:

$$\frac{l}{c}(f_1 - f_2) < 1 \quad (3)$$

This expression may be further simplified by converting the difference in frequency to bandwidth $f$ resulting in the expression $$l \frac{\Delta f}{c} < 1 \quad (4)$$

or transposing:

$$\Delta f < \frac{c}{l} \quad (5)$$

From the geometry of FIGURE 4 it is apparent that $$l = h \left( \frac{1}{\sin \gamma_1} - \frac{1}{\sin \gamma_2} \right) \quad (6)$$

and hence expression (5) may be converted to $$\Delta f < \frac{c}{h \left( \dfrac{1}{\sin \gamma_1} - \dfrac{1}{\sin \gamma_2} \right)} \quad (7)$$

or $$\Delta f < \frac{c}{h} \frac{\sin \gamma_2 \sin \gamma_1}{\sin \gamma_2 - \sin \gamma_1} \quad (8)$$

By similar mathematical analysis in the case where the beam is directed along the vertical with an angle between beam limits of $\beta$ the expression $$\Delta f < \frac{c}{h} \frac{\cos \dfrac{\beta}{2}}{1 - \cos \dfrac{\beta}{2}} \quad (9)$$

is obtained.

The receiving portion of the system which is also mounted on the supporting structure is composed of a photodetector 17 on which the return signal is impressed through a pin hole or slit 18 formed in a diaphragm 19 interposed between the return reflected signal and the detector. If a slit is used, it is so oriented as to be normal to the velocity vector V of the supporting structure relative to the reflecting surface 13. The output of the detector is impressed on a frequency measuring device 21 which may be any well-known frequency meter.

With such an arrangement relative movement between the supporting structure 14 and the reflecting surface 13 (assuming spherical wave front projection) will cause the lobes of the backscattered pattern 16 to be swept across the pin hole or slit 18 at a rate which is proportional to twice the relative velocity between structure 14 and surface 13. Thus the output of the detector 17 will consist of an alternating wave, the average frequency of which is proportional to the relative velocity and the velocity may be read directly by suitably calibrating the frequency measuring device 21.

As heretofore stated the distinct lobes which form the pattern 16 are random in spacing as well as in amplitude. Because of this random spacing the signal generated at the output of the detector 17 will fluctuate in frequency and the frequency measuring device should be so arranged as to have a relatively long time constant to provide an average indication over a suitably selected time interval. Likewise, because of the frequency fluctuation caused by random spacing of the lobes of the reflected pattern, the system using a single slit or pin hole finds its greatest utility when the reflecting surface 13 is a nonspecular surface having a more or less uniform characteristic, such as smooth aluminum or steel strip.

Figure 2:
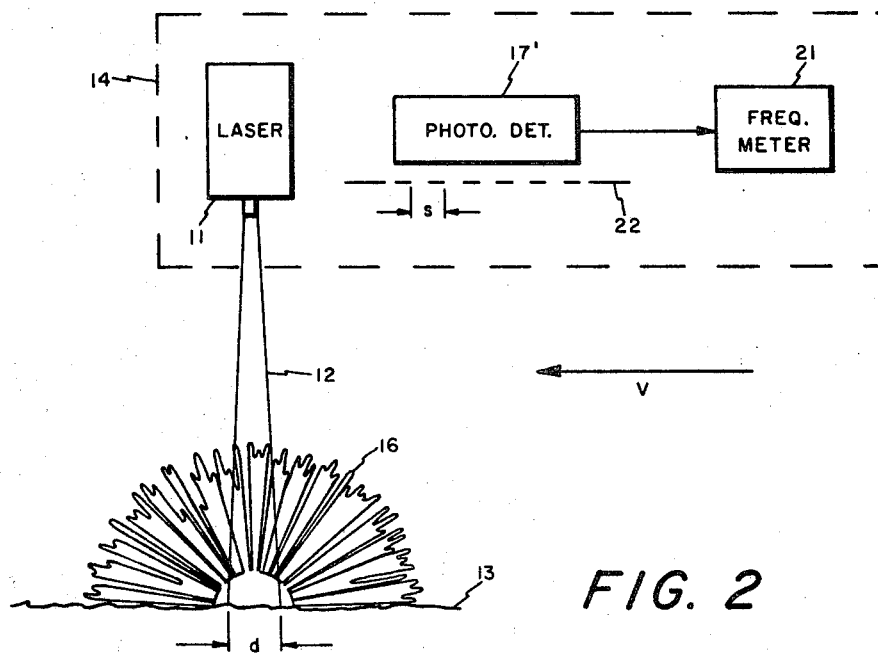
FIGURE 2 is a schematic representation of another embodiment of the invention.
Figure 3:
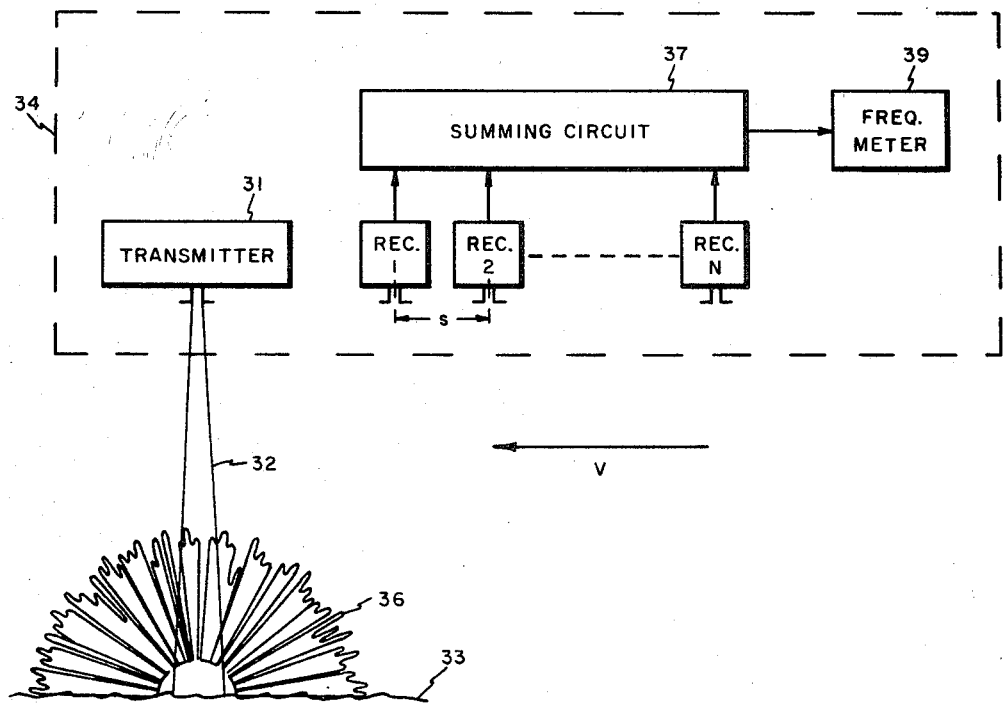
FIGURE 3 is a schematic representation of still another embodiment of the invention.

A system which in large measure overcomes the problem of frequency variations introduced by the used of a single slit or pin hole and which can thus be used with a frequency measuring device of a small time constant and over a wider range of applications is disclosed in FIGURE 2.

In this figure, like elements are referred to by like reference characters and as in the case of the system of FIGURE 1 a beam 12 of monochromatic radiation is emitted by a laser 11 or other monochromatic source is projected toward a backscattering surface 13 which it illuminates over a finite area of diameter $d$. As before a backscattered pattern 16 is produced which pattern is composed of distinct lobes of random amplitude and spacing. Likewise as heretofore described the backscattered pattern is reflected back to a receiving circuit mounted on the supporting structure 14. This receiving circuit consists of a detector 17′ such as a photomultiplier or other photodetector which acts as a summing device for the reflected signals imposed thereon and which produces an output signal which is impressed on a frequency measuring device 21 such as used in the form of the infrom which tan $\delta$ and therefore $\delta$ may be computed since $\phi$, $|V_D|$ and $|V'_D|$ are known.

In addition, solving for the along-heading vector $$V_{AH} = |V| \cos \quad (17)$$

and substituting from Equation 14 for $|V|$ $$V_{AH} = \frac{|V| + |V'_D|}{2 \cos \phi} \quad (18)$$

and solving for the cross-heading vector $$V_{CH} = |V| \sin \delta \quad (19)$$

and substituting from Equation 15 for $|V|$ $$V_{CH} = \frac{|V'| - |V_D|}{2 \sin \phi} \quad (20)$$

It is seen from the above that all the quantities for solving for $V_{AH}$ and $V_{CH}$ are known. Also, knowing $V_{AH}$ and $V_{CH}$, one may readily solve for V, if needed, since $$V = \sqrt{(V_{AH})^2 + (V_{CH})^2} \quad (21)$$

While several embodiments of the invention have been shown and described for illustration purposes, it is to be expressly understood that the invention is not limited thereto. Various changes may also be made in the design and arrangement of the parts without departing from the spirit and scope of the invention as the same will now be understood by those skilled in the art.

What is claimed is:
1. A velocimeter for determining the relative velocity between two objects comprising,
   a source of coherent light of narrow bandwidth mounted on the first of said objects directing a narrow beam of light toward the second of said objects illuminating a finite area thereon to produce a reflected power pattern of distinct lobes of random amplitude and spacing,
   an optical grating located on said first object, said grating including a plurality of alternate longitudinal translucent and opaque areas, said optical grating being so oriented that said alternate transparent and opaque areas are substantially normal to a velocity vector determined by the relative velocity between said two objects,
   a photodetector located on said first object adjacent said grating on the side remote from said second object producing a plurality of signals from successive distinct lobes of said reflected power pattern as said lobes are swept past successive transparent areas of said grating and summing said signals to produce a sum output signal which is a Gaussian spectrum of output frequencies the average frequency of which is proportional to the relative velocity between said two objects, and
   means for measuring the average frequency of said sum output signal.

2. A velocimeter as set forth in claim 1 in which said light source is monochromatic.

3. A velocimeter as set forth in claim 1 in which the width of the transparent areas of said grating is made approximately equal to 74% of the diameter of the radiating aperture of said light source and the spacing between said transparent areas from the leading edge of one transparent area to the leading edge of the next transparent area is made approximately equal to twice the diameter of said radiation aperture.

References Cited

UNITED STATES PATENTS 3,102,263  8/1963  Meyer _____ 343—8
3,147,477  9/1964  Dickey _____ 343—8
3,150,363  9/1964  Finnold.

OTHER REFERENCES

Huntley, W.: New Coherent Light Diffraction Techniques, IEEE Spectrum, vol. 1, #1, January 1964, pp. 114–122.

Oliver: Sparkling Spots and Random Diffraction, Proc. IEEE, vol. 51 #1, pp. 220–1, January 1963.

Langmuir: Scattering of Laser Light, Appl. Phys. Lttrs., vol. 2, #2, Jan. 15, 1963, pp. 29–30.

Rigden et al.: Granularity of Opt. Maser Light, Proc. IRE, vol. 50, pp. 236–8, November 1962.

Rex Pay: Stanford Electronics Labs. Pursues Laser, Ion-Propulsion Studies; Missiles and Rockets, Sept. 16, 1963, p. 24.

RONALD L. WIBERT, *Primary Examiner.*

V. P. McGRAW, *Assistant Examiner.*

U.S. Cl. X.R.

331—94.5; 343—8